(12) United States Patent
Xu et al.

(10) Patent No.: US 7,534,527 B2
(45) Date of Patent: May 19, 2009

(54) ORGANIC LITHIUM SALT ELECTROLYTES HAVING ENHANCED SAFETY FOR RECHARGEABLE BATTERIES AND METHODS OF MAKING THE SAME

(75) Inventors: Zhiqiang Xu, Parsippany, NJ (US); Chi-Kyun Park, Montville, NJ (US); Zhiwei Zhang, Bedminster, NJ (US); Chai Chul, Saddle River, NJ (US)

(73) Assignee: SKC Power Tech, Inc., Mt. Olive, NJ (US)

( * ) Notice: Subject to any disclaimer, the term of this patent is extended or adjusted under 35 U.S.C. 154(b) by 737 days.

(21) Appl. No.: 10/952,481

(22) Filed: Sep. 29, 2004

(65) Prior Publication Data

US 2006/0068295 A1    Mar. 30, 2006

(51) Int. Cl.
*H01M 6/04*      (2006.01)
*H01M 6/16*      (2006.01)

(52) U.S. Cl. .................. 429/207; 429/188; 429/338

(58) Field of Classification Search .............. None
See application file for complete search history.

(56) References Cited

U.S. PATENT DOCUMENTS

| | | | |
|---|---|---|---|
| 4,505,997 A | 3/1985 | Armand et al. | |
| 4,767,444 A | 8/1988 | Heywang et al. | |
| 5,273,840 A | 12/1993 | Dominey | |
| 6,001,325 A | 12/1999 | Salmon et al. | |
| 6,210,830 B1 | 4/2001 | Sartori et al. | |
| 6,395,671 B2 * | 5/2002 | LaPointe ............... | 502/150 |
| 2003/0108800 A1 | 6/2003 | Barbarich | |

FOREIGN PATENT DOCUMENTS

DE   198 29 030 C1   10/1999

OTHER PUBLICATIONS

Barbarich et al, "New Family of Lithium Salts for Highly Conductive Nonaqueous Electrolytes," *Inorganic Chemistry*, vol. XX, No. XX, XXXX (10 pages), pp. A-J.

Aurbach et al, "Vinylene Carbonate and Li Salicylatoborate as Additives in LiPF$_3$ (CF$_2$ CF$_3$)$_3$ Solutions for Rechargeable Li-Ion Batteries," *Journal of The Electrochemical Society*, 151 (1) A23-A30 (2004) (8 pages).

(Continued)

*Primary Examiner*—Dah-Wei D Yuan
*Assistant Examiner*—Edu E Enin-Okut
(74) *Attorney, Agent, or Firm*—Nixon & Vanderhye P.C.

(57) ABSTRACT

Organic lithium salts suitable for use in electrolytes for primary or secondary rechargeable batteries include de-localized bulky anions over Lewis acid fragments, typically BF$_3$, and organic moieties. The organic moieties may be, for example, anions derived from fused nitrogen heterocycles (e.g. benzeneimidate, benzitriazolate and the like); multi carboxylates (e.g. oxalate, 1,2,4,5-benzenetetracarboxylate and the like), and pyromellitic diimidate. The organic lithium salts of the invention have the general formula: $Li_q[Org(MX_n)_m]$, in which Org represents the organic moieties and $MX_n$ represents an organic or inorganic boron, aluminum or phosphorous containing Lewis acid. The organic lithium salts are conveniently prepared by reacting an organic compound having at least one de-protonation group selected from NH, OH, SH or COOH with an inorganic or organic lithium compound to generate an organic lithium processor salt, and thereafter bringing the organic lithium processor salt into contact with an inorganic or organic Lewis acid to obtain the organic lithium product salt.

3 Claims, 4 Drawing Sheets

OTHER PUBLICATIONS

Barbarich et al, "A Lithium Salt of a Lewis Acid-Base Complex of Imidazolide for Lithium-Ion Batteries," *Electrochemical and Solid-State Letters*, 6 (6) A113-A116 (2003) (4 pages).

Eberwein et al, "Synthesis and Electrochemical Properties of Some Lithium Chelatophosphates," *Journal of the Electrochemical Society*, 150 (7) A994-A999 (2003) (6 pages).

Gnanaraj et al, $LiPF_3(CF_2CF_3)_3$ : A Salt for Rechargeable Lithium Ion Batteries, *Journal of The Electrochemical Society*, 150 (4) A445-A454 (2003) (9 pages).

LaPointe et al, "New Family of Weakly Coordinating Anions," *Journal American Chemical Society 2000*, 122, 9560-9561 (2 pages).

Nolan et al, "Nonaqueous Lithium Battery Electrolytes Based on Bis(polyfluorodiolato)borates," *Journal of The Electrochemical Society*, 150 (12) A1726-A1734 (2003) (9 pages).

Nanbu et al, "Lithium Tris[3-fluoro-1,2-benzenediolato(2)-)-O,O']phosphate as a Novel Lithium Salt for Lithium Battery Electrolytes," *Electrochemical and Solid-State Letters*, 5 (9) A202-A205 (2002) (4 pages).

Schmidt et al, "Lithium fluoroalkylphosphates: a new class of conducting salts for electrolytes for high energy lithium-ion batteries," *Journal of Power Sources* 97-98 (2001) 557-560 (4 pages).

Sun et al, "A New Additive for Lithium Battery Electrolytes Based on an Alkyl Borate Compound," *Journal of the Electrochemical Society*, 149 (3) A355-A359 (2002) (5 pages).

Xu et al, "LiBOB as Salt for Lithium-Ion Batteries; A Possible Solution for High Temperature Operation," *Electrochemical and Solid-State Letters*, 5 (1) A26-A29 (2002) (4 pages).

Xu et al, "LiBOB and Its Derivatives; Weakly Coordinating Anions, and the Exceptional Conductivity of Their Nonaqueous Solutions," *Electrochemical and Solid-State Letters*, 4 (1) E1-E4 (2001) (4 pages).

Yamaguchi et al, "Lithium Tetrakis(haloacyloxy)borate: An Easily Soluble and Electrochemically Stable Electrolyte for Lithium Batteries," *Journal of The Electrochemical Society*, 150 (3) A312-A315 (2003) (4 pages).

\* cited by examiner

ORGANIC LITHIUM SALT ELECTROLYTES HAVING ENHANCED SAFETY FOR RECHARGEABLE BATTERIES AND METHODS OF MAKING THE SAME

FIELD OF THE INVENTION

The present invention relates generally to electrolytes for electrochemical energy storage devices (e.g., batteries). In especially preferred forms, the present invention relates to organic lithium salts, which are usefully employed in electrochemical energy storage devices, including Li-ion batteries, Li-ion polymer batteries, dry Li-ion polymer batteries and solid lithium polymer batteries.

BACKGROUND AND SUMMARY OF THE INVENTION

The rapid development of electronic devices requires safer batteries having higher energy densities. In this regard, recent research and development efforts to improve battery performance have been mainly focused on lithium and/or Li-ion systems. However, in such battery systems, the conductivity and stability of existing electrolytes have not been optimized with regard to battery safety and performance. In any event, the increased demand for high capacity rechargeable batteries in applications including military devices, electric vehicles (Evs/HEVs) and aero-vehicles has been a principal driving force for the research and development of safe lithium and/or lithium ion batteries.

Lithium and lithium ion batteries normally operate in a voltage range from 3.0 to 4.2 V vs Li/Li$^+$. In liquid or gel-polymer lithium-ion batteries, it is common to use an electrolyte containing alkyl carbonates, such as ethylene carbonate (EC), dimethyl carbonate (DMC), diethyl carbonate (DEC), ethylmethyl carbonate (EMC) and propylene carbonate (PC). These non-aqueous electrolytes are not thermodynamically stable in the operational voltage range of the batteries. Thus, for such commonly employed electrolytes, it is possible that electrolyte reduction and oxidation could occur at the anode and cathode respectively. In order to prevent such an occurrence, a complete and stable solid electrolyte interphase (SEI) has to be formed. In this regard, it is well known that ethylene carbonate (EC) has excellent SEI-forming properties for carbonaceous anodes, and as a result has been widely used.

Two types of lithium salts, inorganic and organic, are commercially available. Inorganic salts include lithium hexafluorophosphate (LiPF$_6$) and lithium tetrafluoroborate (LiBF$_4$). Organic salts include lithium trifluoromethane-sulfonate (LiCF$_3$SO$_3$, LiTf), Armand's compounds (see U.S. Pat. No. 4,505,997, the entire content of which is expressly incorporated hereinto by reference), lithium bis(trifluoromethane-sulfonyl)-imide (LiN(SO$_2$CF$_3$)$_2$, LiTFSI), and lithium bis(trifluoroethanesulfonyl)imide (LiN(SO$_2$CF$_2$CF$_3$)$_2$, LiBETI). Organic lithium salts are believed to be safer.

Existing salts used in commercial lithium batteries are not as stable or as conductive as expected. In recent years, extensive world-wide efforts have been undertaken to develop practically effective substitutes, especially organic lithium compounds. Cost, performance and safety are considered the three key factors in choosing the electrolyte for commercial applications. All lithium salts including commercially available salts, such as LiPF$_6$, LiBF$_4$, LiOSO$_2$CF$_3$, LiN(SO$_2$CF$_3$)$_2$, LiN(SO$_2$CF$_2$CF$_3$)$_2$, and salts under development, such as LiC(SO$_2$CF$_3$)$_2$, LiBOB, LiPF$_3$(SO$_2$CF$_3$)$_3$, do not fully meet the above three requirements. By way of example, although LiPF$_6$ has excellent conductivity in a liquid electrolyte, a wide electrochemical stability window, and exhibits low toxicity and non-corrosiveness to substrates, it always contains trace amounts of HF acid according to the following equilibrium and hydrolysis as illustrated by Xu et al., Electrochem. Solid-State Letters, 5(1), A26 (2002) (the entire content of which is expressly incorporated hereinto by reference) which degrades battery performance.

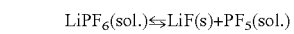

A process for generating acid-free lithium salt solutions using weak base resins is described in U.S. Pat. No. 6,001,325 (the entire content of which is expressly incorporated hereinto by reference) and seems to work effectively. However, such a process will obviously increase production costs. In order to overcome the problem of generating HF acid, it has been proposed in U.S. Pat. No. 6,210,830 (the entire content of which is expressly incorporated hereinto by reference) to provide LiPF$_3$(CF$_2$CF$_3$)$_3$ to replace LiPF$_6$. When using a LiPF$_3$(CF$_2$CF$_3$)$_3$ containing electrolyte, both the anode (Li or graphite) and cathode (LiMn$_2$O$_4$) performed better as compared with a LiPF$_6$ solution (See, J. Electrochem. Soc., 151, A23 (2004); J. Electrochem. Soc., 150, A445 (2003); and J. Power Sources, 97-98, 557 (2001), each incorporated fully herein by reference). However, LiPF$_3$(CF$_2$CF$_3$)$_3$ is much more expensive than LiPF$_6$.

Other commercially-available salts are problematic also. For example, LiBF$_4$ exhibits poor solubility and has HF contamination. Both LiOSO$_2$CF$_3$ and LiN(SO$_2$CF$_3$)$_2$ are highly corrosive to aluminum substrates at potentials above 2.79 V and 3.67 V respectively, which is not high enough for most advanced rechargeable lithium batteries. Lithium methide, LiC(SO$_2$CF$_3$)$_2$, (see U.S. Pat. No. 5,273,840, the entire content of which is expressly incorporated hereinto by reference) is presently under development, but the price thereof may be an obstacle for consumer applications. The present applicants' testing has shown that, although LiBETI yields performance comparable to that of LiPF$_6$ at ambient temperature, it has poor performance at elevated temperatures (e.g. higher than 80° C.). In any event, the costs for commercially available LiBETI electrolytes is several times higher than those employing LiPF$_6$. A very promising salt, lithium bis(oxalato) borate, LiBOB (German Pat. DE19829030 C1 (1999), incorporated fully by reference herein) also has disadvantages, including unsatisfactory performance in battery systems containing LiCoO$_2$, poor solubility in common carbonate solvents and hydrolytic instability.

Since organic salts may have better safety and higher conductivity, significant efforts have been made to synthesize organic lithium salts which are less expensive and more conductive. Typical examples include lithium borates and phosphates which are well known thermally stable salts with equally well known disadvantages. For example, lithium tetrkis(haloacyloxy) borates, Li[B(OCORX)$_4$] (Yamaguchi, et al., J. Electrochem. Soc., 150, A312 (2003), incorporated fully herein by reference), are less conductive and thermally less stable as compared with LiPF$_6$; lithium bis(polyfluorodiolato) borates, represented by LiB[OCPh(CF$_3$)$_2$]$_4$ (Strauss, et al., J. Electrochem. Soc., 150, A1726 (2003), incorporated fully herein by reference), and have poor solubility in common carbonate solvents. Lithium tris(polyfluorodiolato) phosphates (Nanbu et al., Electrochem. Solid-State Letters, 5(9), A202 (2002) and Eberwein, et al., J. Electrochem. Soc., 150, A994 (2003)) are difficult to prepare and have low oxidative decomposition potential. Lithium salts in which the anions are dicarboxylic acid derivatives of orthoborate are also known. (See, Xu et al, Electrochemical and Solid State Letters, 4(1) E1-E4 (2001), the entire content of which is expressly incorporated hereinto by reference.)

One interesting salt is lithium bis(trifluoroborane)imidazolide [LiIm($BF_3$)$_2$] (see, Barbarich et al., Electrochem. Solid-State Letters, 6(6), A113 (2003), incorporated fully by reference herein). Using such a compound in lithium batteries was performed by Sun et al., (J. Electrochem. Soc., 149, A355 (2002) and LaPointe et al., (J. Am. Chem. Soc., 122, 9560 (2000), each incorporated fully herein by reference. It has thus been demonstrated that a cell with an electrolyte containing [LiIm($BF_3$)$_2$] has a comparable performance to a cell containing $LiPF_6$. Unfortunately, the synthesis of such a lithium salt is expensive (i.e., since it requires using n-BuLi) and is time-consuming (i.e., taking more than eight days). In addition, the salt made in such a way contains significant amounts of impurities even after purification. Cells containing such a salt show poor over-change safety and temperature performance. There is no suggestion in the Barbarich et al article of any better synthesis techniques to make [LiIm($BF_3$)$_2$], nor is there any mention of any type of bridging groups other than imidazolide.

It would thereby be highly desirable if effective and efficient procedures using economical starting materials were provided which enabled the synthesis of a class of organic lithium salts containing extensively charge-delocalized anions, particularly for use in lithium batteries including liquid lithium-ion batteries, gel polymer batteries, dry polymer batteries and solid polymer batteries. It would also be highly desirable the safety performance could be improved by using such prepared salts for lithium batteries and/or increase the energy density by using less content of such prepared salts in the electrolyte. Finally, it would be highly desirable if the fabrication of electrodes and ionic conductive separators could be facilitated using extraction techniques. It is towards providing such needs that the present invention is directed.

Broadly, the present invention is embodied in organic lithium salts and methods of making the same which are usefully employed in electrochemical energy storage systems (e.g., batteries) and exhibit improved properties and performance as compared to conventional lithium salts employed for similar purposes. More specifically, the present invention is embodied in organic lithium salts having the formula $Li_q[Org(MX_n)_m]$, wherein Org represents an organic ion, $MX_n$ represents typical inorganic or organic Lewis acids and each of q, n and m is independently 1 or greater, preferably 1 to 4.

Electrochemical cells and batteries, particularly lithium rechargeable batteries, which comprise an anode, a cathode and a non-aqueous electrolytes containing the organic lithium salts of the present invention, exhibit improved properties. For example, the organic lithium salts of the present invention offer enhanced thermal stability, which is crucially required in an extrusion process for making electrodes and ionic conductive separators. Also, the method of making the organic lithium salts of the present invention has an associated lower cost and is simpler (e.g., having one or two reaction steps) as compared to the synthesis procedures of conventional lithium salts.

These and other aspects and advantages of the present invention will become more apparent after careful consideration is given to the detailed description of the preferred exemplary embodiments thereof which follow.

BRIEF DESCRIPTION OF THE ACCOMPANYING DRAWINGS

Reference will hereinafter be made to the accompanying drawings, wherein.

DETAILED DESCRIPTION OF THE INVENTION

Figure 1:
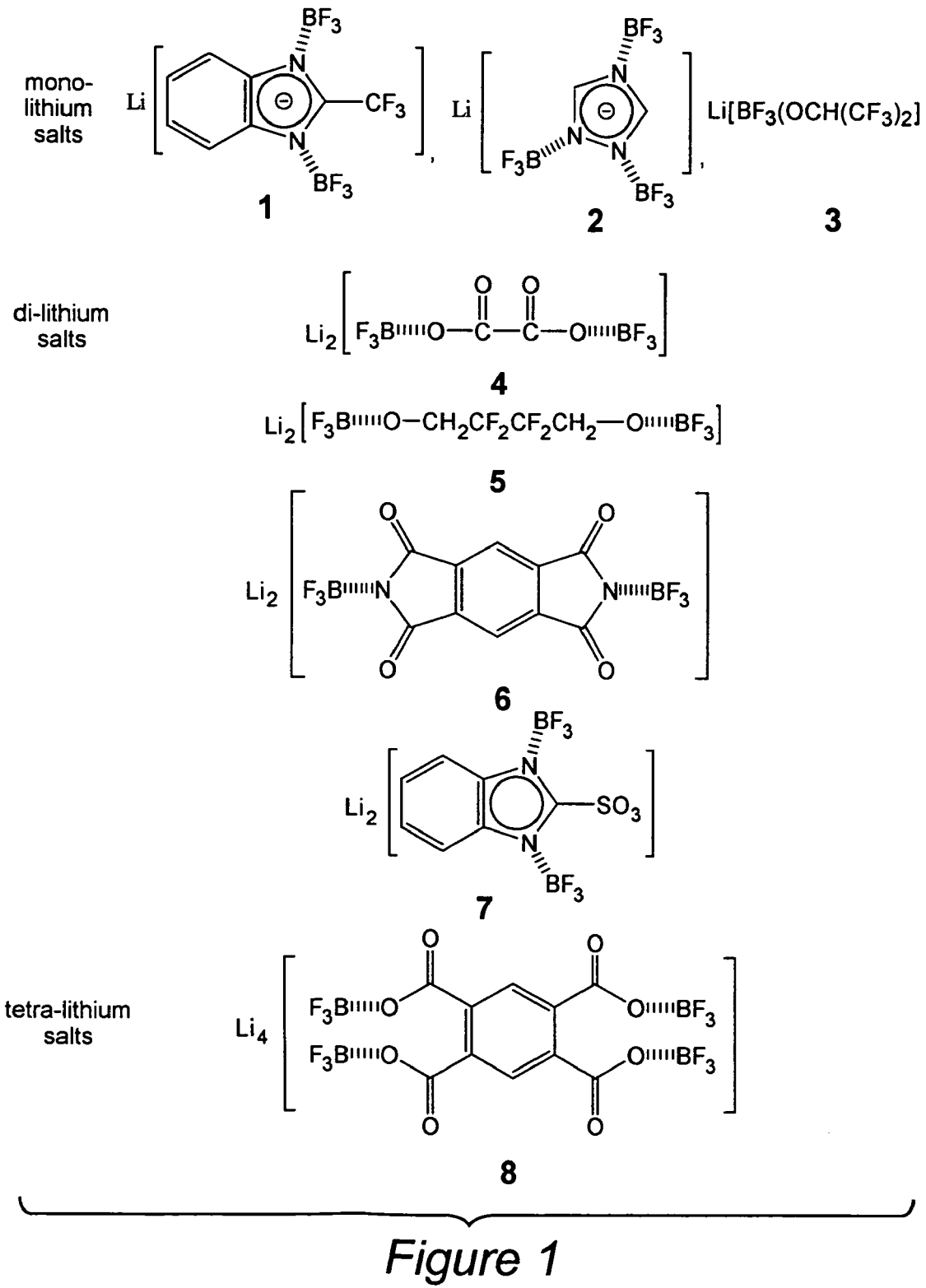
FIG. 1 is shows the chemical structures for several exemplary salts according to the present invention usefully employed as electrolytes for lithium rechargeable batteries.

The organic lithium salts of the present invention may generally be described as comprising de-localized bulky anions over Lewis acid fragments, typically $BF_3$, and organic moieties. The organic moieties may be, for example, anions derived from fused nitrogen heterocycles (e.g. benzeneimidate, benzitriazolate and the like); multi carboxylates (e.g. oxalate, 1,2,4,5-benzenetetracarboxylate and the like), and pyromellitic diimidate. The organic lithium salts of the invention have the general formula: $Li_q[Org(MX_n)_m]$, in which Org represents the organic moieties and $MX_n$ represents a Lewis acid.

Preferred organic anions Org are those exemplified by the following formulas I-III:

$R(COO)_n^{n-}$ (I)

$R^1(C{=}O){-}N{-}R^2)_n^{n-}$ (II)

$R^1(S({=}O)_2{-}N{-}R^2)_n^{n-}$ (III)

wherein R (which may or may not be present) and $R^1$ are independently selected from the group consisting of alkyl, alkylene or aryl, $R^2$ is alkyl, alkylene, aryl, carbonyl or sulfonyl, wherein alkyl, alkylene or aryl may each optionally substituted by a halogen selected from fluorine, chlorine, bromine or iodine and n is 1 or greater, preferably 1 or 2.

The organic ion may also be derived from monovalent or multivalent alkoxides which may optionally be substituted with a halogen, such as fluorine, or derived from one or more fused or non-fused nitrogen-containing heterocylces, such as fused and non-fused imidazolate (e.g., benzimidazolate, fused and non-fused triazolates, multi-carboxilates, such as oxalate ($C_2O_4^{2-}$), aromatic ring fused multi-carboxilates, such as 1,2- or 1,4-$C_6H_4(COO)_2$, 1,2,4,5-$C_6H_2(COO)_4$); multivalent imidates, such as pyromellitic diimidate, wherein the aromatic ring is either unsubstituted or substituted with alkyl, alkylene, aryl or a halogen selected from fluorine, chlorine, bromine or iodine.

Any conventional Lewis acid may be employed in the practice of the present invention. Thus, for example, inorganic boron, aluminum and phosphorous containing Lewis acids represented by $BX_3$, $AlX_3$, $PX_5$, where X is a halogen atom selected from F, Cl, Br and I may be satisfactorily employed. Specific preferred examples of suitable inorganic Lewis acid compounds include $BF_3$ and $AlF_3$. Organic boron, aluminum and phosphorous containing Lewis acid compounds, such as $(C_6F_5)_3B$, and the like may also be employed in the practice of the present invention.

The preparation of the organic lithium salts of the present invention may be conveniently conducted in two relatively simple synthesis steps. In a first step, a suitable organic compound, which contains potentially de-protonated groups, e.g. NH, OH, SH, COOH, may be caused to react with an appropriate base, e.g. LiOH, LiH, LiR, LiOR (R=alkyl) either in an aqueous or non-aqueous condition, typically in anhydrous THF or toluene, depending upon the property of the organic compounds to generate an organic lithium salt which is defined as a processor salt. In a second step, a fully dried the processor salt made in the first step may then be mixed with anhydrous THF. In most cases, the processor salts are not soluble in THF. However, in any situation, after addition of boron trifluoride complex, $BF_3$.THF, $BF_3$.$Et_2O$, the mixture will turn into a clear solution within a few hours depending on the reaction temperatures. Preferably, the reaction should be carried out at room temperature. The final salt, which consists of de-localized bulky anions over Lewis acid and organic fragments, is obtained either by adding anhydrous less polar solvent, such as $CH_2Cl_2$, toluene, to the reaction solution or by removal of solvent THF and the un-reacted boron trifluoride complex from the reaction (i.e., since a slight excess amount of boron trifluoride complex is typically added). The salts can also be prepared by adding the processor salt to an excess amount of some boron trifluride complexes without extra solvents. The preferred boron trifluoride complex is boron trifluoride etherate since it has a low boiling point and thus is capable of being easily removed.

The chemical structures of example salts of the invention are shown in accompanying FIG. 1 and identified as salts 1 through 8, inclusive. As shown, the mono-lithium salts are those salts which comprise of one lithium cation and any Lewis acid-base type of bulky anion. The di-lithium salts are those which contain, but not limited to, a symmetrical Lewis acid-base type bulky anion (e.g., such as the salt 7 in FIG. 1). The multi-lithium salts may include any salts that contain one bulky anion and more than two cations in each molecule.

Figure 2:
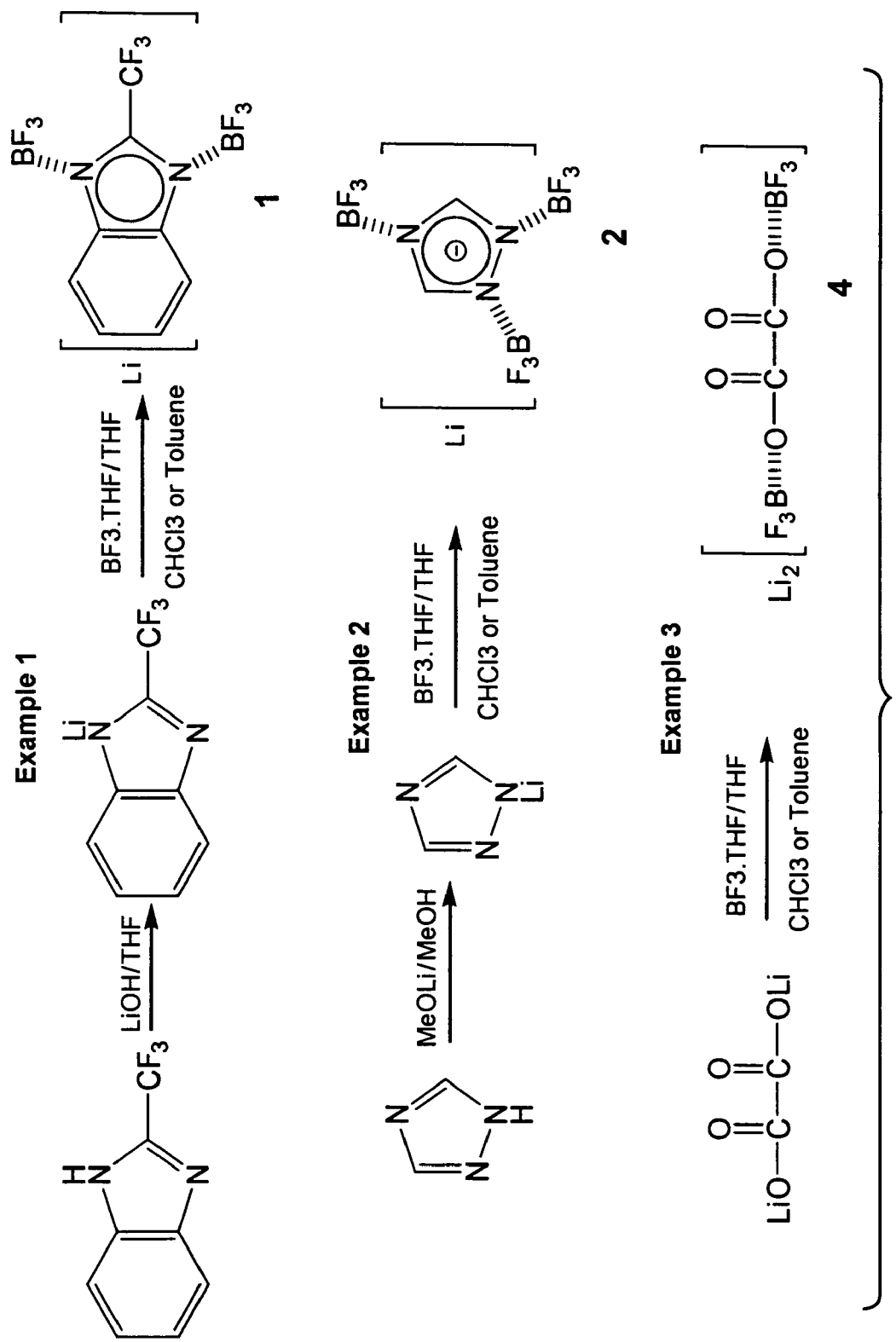
FIG. 2 shows a presently preferred reaction scheme to synthesize the organic lithium salts of the present invention.

Examples of typical procedures for synthesizing the salts of the invention are illustrated in FIG. 2. In synthesis Example 1 shown in FIG. 2, a typical procedure for making a salt from a heterocycle which can be easily to be de-protonated is shown. The compound, 2-trifluromethylbenzimidazole (2-TFMBI), used in the invention was made according to a modified procedure disclosed in U.S. Pat. No. 4,767,444 (the entire content of which is expressly incorporated hereinto by reference), by which 2.5 equivalent amount of trifluoroacetic acid was slowly added into one equivalent amount of o-phenylenediamine and the mixture was refluxed for four hours to form a clear dark solution. This solution was cooled down to room temperature and neutralized to pH of 7~8, in which the white crystalline product forms. Commercially available forms of 2-trifluromethylbenzimidazole are normally not pure enough for the purpose of the present invention. The conversion of 2-trifluromethylbenzimidazole to its lithium salt form can be accomplished either in water neutralized by LiOH hydrate or in organic solvent, e.g. alcohol, nitrile or cyclic ether, preferred to be THF, neutralized by anhydrous LiOH or LiOMe. The precursor lithium salt of 2-triflurom-ethylbenzimidazole was added into an excess amount of $BF_3$.THF (two extra times of theoretical amount are preferred). The mixture will turn into a clear solution within about 1 to about 2 hours depending on temperature. The white crystalline salt 1 was obtained by adding $CH_2Cl_2$ or $CHCl_3$ into the resulting clear solution and re-crystallizing.

A precursor lithium salt of 1,2,4-triazole in the synthesis Example 2 of FIG. 2 was formed through a reaction of a methanol solution of 1,2,4-triazole with lithium methoxide. The procedures for synthesis of the other salts are similar to that of Salt 1 as described above.

The following examples are intended to explain the synthesis of the salts in the invention in more detail.

EXAMPLE 1

2-(trifluoromethyl)benzimidazole, 285.1 g of trifluoroacetic acid was added slowly using a micro-pump to 108.1 g of o-phenylenediamine with 30 minutes. The temperature of the mixture increased but can easily be controlled by adjusting the adding speed. After the addition was complete, the mixture was refluxed for about 4 hours following which it became a clear, dark solution. After cooling, the mixture was neutralized to pH=7~8 with NaOH. The crystalline white precipitate was collected by filtration and re-crystallized in acetone. Total yield was 87.5%. The melting point: was determined to be 209-211° C. by DSC (ref. 208-211° C.).

Lithium 2-(trifluoromethyl)benzimidazolate, LiTFBI, 18.6 g (0.100 moles) of 2-(trifluoromethyl)benzi-midazole was dissolved in 50 mL THF to give a clear colorless solution. To the solution, 12 g of LiOH (0.5 moles) was added and the mixture was refluxed for 1 hours. The unreacted LiOH was removed by filtration and the lithium 2-(trifluoro-methyl)benzimidazolate was obtained by removing the THF solvent, dried under vaccum at 60° C. The yield was 97.2%

Li[$BF_3$(TFBI)], 19.2 g (0.100 moles)of lithium 2-(trifluoromethyl)benzi-midazolate, LiTFBI, was introduced into a 50 mL THF solution containing 35 g (0.25 moles) of $BF_3$.THF complex with stirring. The mixture was kept stirring for 2 hours at room temperature of 50° C. to become a clear solution. Where upon the THF solvent was removed and a less polarized solvent, typically dichloromethane was added to precipitate the product. The product was re-crystallized in DEC/dichloromethane and dried under vacuum. Overall yield is not less than 75%.

EXAMPLE 2

Lithium 1,2,4-triazolate, LiTAZ, 6.9 g (0.100 moles) of 1,2,4-triazole was dissolved in 50 mL dry methanol resulting in a clear colorless solution. To the solution, 3.9 g of LiOMe (0.10 moles) was added and the mixture was refluxed and stirred for 1 hour. Lithium 1,2,4-triazolate, LiTAZ was obtained by removing the solvent, dried under vacuum at 60° C. for 15 hours. The yield was 98.0%. The DSC profile (25 to 300° C.) shows no unreacted 1,2,4-triazole moities.

Li[($BF_3$)$_3$(TAZ)], 7.5 g (0.100 moles) of lithium 1,2,4-triazolate was added into a 50 mL THF solution containing 49 g (0.35 moles) of $BF_3$.THF complex with stirring. The mixture was continuously stirred for 2 hours at room temperature of 50° C. and became a clear solution. Most of the THF solvent was thereafter removed from the solution and dichloromethane was added to precipitate out the product. The product was re-crystallized in DEC/dichloromethane and dried under vacuum at 60° C. for 15 hours. Overall yield was not less than 75%. The melting point was 90° C. and decomposition temperature was 224° C.

EXAMPLE 3

$Li_2$[($BF_3$)$_2$(Ox)], 10.1 g (0.100 moles) of lithium oxalate was added into a 50 mL THF solution containing 42 g (0.30 moles) of $BF_3$.THF complex with stirring. The mixture was continuously stirred for 4 hours at room temperature of 50° C. and became a clear solution, from which most of the THF solvent is removed and dichloromethane was added to isolated the white solid product. The product was re-crystallized in DEC/dichloromethane and dried under vacuum at 60° C. for 15 hours. Overall yield is 85%. Melting point: 267° C. (dec).

EXAMPLE 4

Li[BF$_3$(AcO)], 26 g (0.395 moles) of anhydrous lithium acetate was added into a 75 mL THF solution containing 53.2 g (0.380 moles) of BF$_3$.THF complex with stirring. The mixture was continuously stirred for 2 hours at room temperature and became a clear solution. Most of the THF solvent was removed from the solution and dichloromethane was added to precipitate out the product. The product was re-crystallized in DEC/dichloromethane and dried under vacuum at 60° C. for 15 hours. The yield was 90.2%. Melting point was determined to be 139° C., and the decomposition temperature was 240° C.

Testing Procedures

Figure 3:
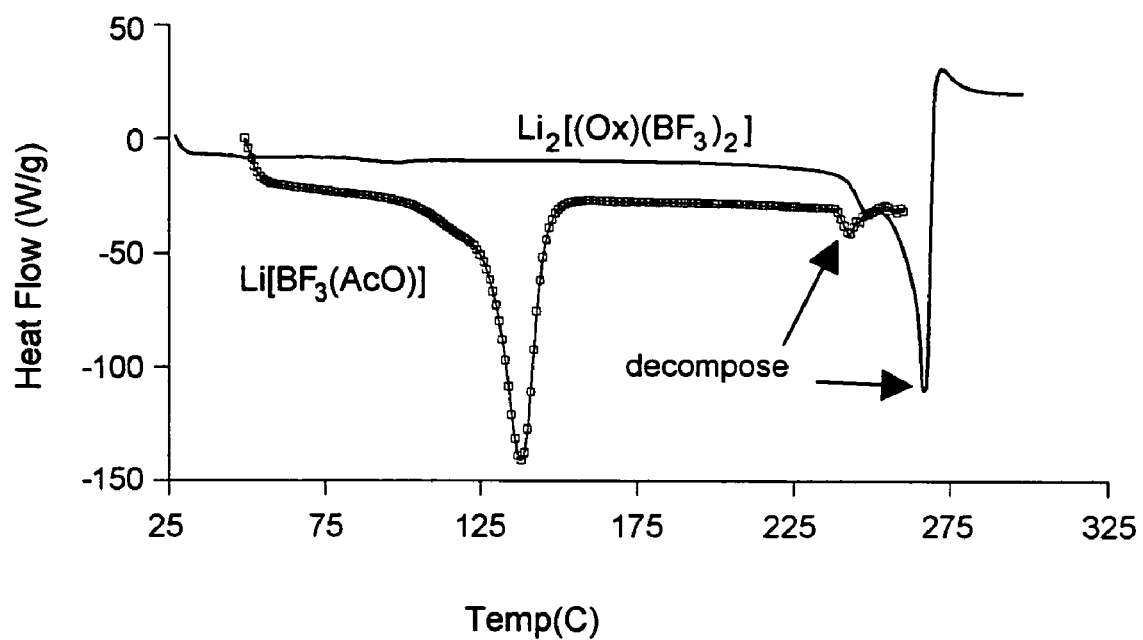
FIG. 3 shows the DSC profiles of exemplary salts (Li[$BF_3$(AcO)], solid line; $Li_2[Ox(BF_3)_2]$, broken line) in nitrogen atmosphere using a scan rate of 10° C./min.

The thermal stability of the salts was determined using TA Instruments (DSC2920) at a heating rate of 10° C./min to obtain a DSC thermogram. Most of the lithium salts according to the present invention are thermally stable up to more than 200° C. FIG. 3 shows DSC curves for Li[BF$_3$(AcO)] and Li$_2$[(BF$_3$)$_2$(Ox)].

Figure 4:
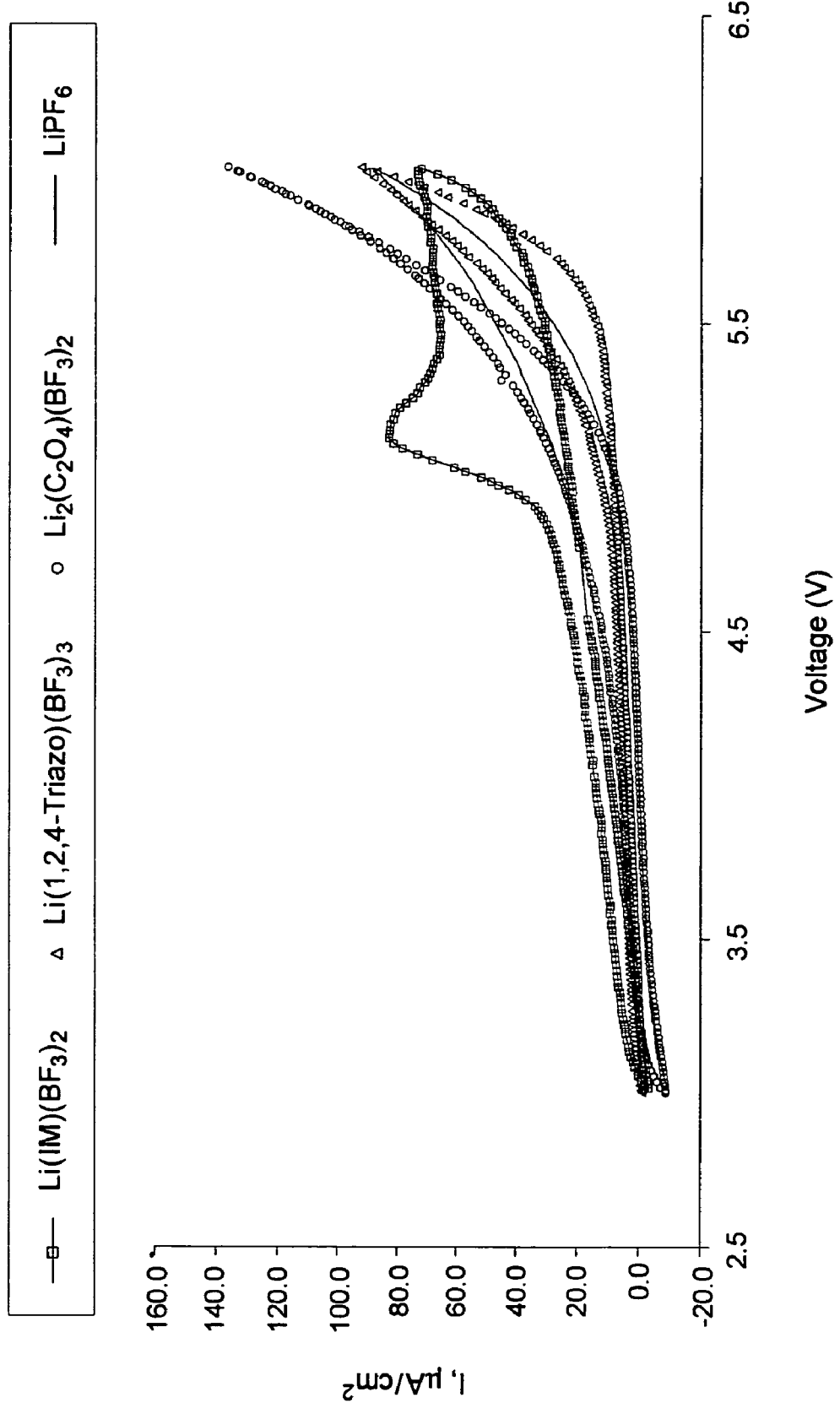
FIG. 4 shows cyclic voltammograms of exemplary salts in EC/DEC solutions in a cell with platinum as the working electrode, and lithium as the counter and reference electrodes.

The electrochemical stability of the salts (ca. 1.0 M) in a solvent mixture of EC/DEC (36/54 wt %) was studied with the results of such study being depicted in FIG. 4. In this regard, FIG. 4 clearly shows that, for most of the salts according to the present invention, the electrochemical window is at least 4.5 V vs. Li$^+$/Li. In each case the electrochemical window iis probably limited by the solvent.

Pouch cells were prepared comprised of a conventional LiCoO$_2$ cathode, a graphite anode and liquid electrolytes with CELGARD® trilayer microporous film separator (PP/PE/PP, 16 um). The liquid electrolyte contained lithium salts (12 wt %) in a solvent mixture of EC/DEC (36/54 wt %). The surface area of the cells was approximately 210 cm$^2$. The cells were cycled between 4.2V and 3.0V at 165 mA (approximately 0.25 C rate) by using Maccor cycler. The charge cut-off current was 32.5 mA. Table 1 below summarizes the ionic conductivity of the electrolytes, capacity and overcharge safety of the cells. Fully charged cells were overcharged up to 6V at 2 C-rate (1.3 A) by using a power supply (Hewlett Packard, 6642A). As shown in Table 1, those cells with the organic lithium salt according to the present invention have similar capacities compared to cells containing conventional commercially available inorganic lithium salts, such as LiBF$_4$ and LiPF$_6$. Importantly, however, some of the organic salts show superior overcharge safety characteristics as compared to the conventional commercially available inorganic lithium salts, such as LiBF$_4$ and LiPF$_6$.

TABLE 1

Ionic conductivity of the electrolytes, capacity and overcharge safety of cells for the exemplary salts.

| Salts | Ionic conductivity of electrolyte, mS/cm | Cell capacity at 0.25 CmA at RT | Cell capacity at 1.0 CmA at RT | Overcharge safety |
|---|---|---|---|---|
| LiPF$_6$ | 5.9 | 661 | 653 | Fire |
| LiBF$_4$ | 2.4 | 647 | 641 | Fire |
| Li(TAZ)(BF$_3$)$_3$ | 2.8 | 644 | 623 | Fire |
| Li(TFBI)(BF$_3$)$_2$ | | 647 | 634 | No fire, no smoke |
| CH$_3$COOLi (BF$_3$) | 2.6 | 651 | 644 | Fire |
| Li$_2$[(Ox)(BF$_3$)$_2$] | 2.9 | 652 | 626 | No fire, no smoke |
| Li[(CF$_3$)$_2$CHO(BF$_3$)] | 2.4 | | | |
| Li[Im(BF$_3$)$_2$] | 2.6 | 636 | 625 | Fire |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a non-aqueous electrolyte comprising an organic lithium salt comprising:
    (a) reacting 2-trifluromethylbenzimidazole with an inorganic lithium compound selected from LiOH and LiH to generate an organic lithium processor salt, and thereafter
    (b) bringing the organic lithium processor salt into contact with an inorganic or organic Lewis acid to obtain an organic lithium product salt, and thereafter
    (c) forming the non-aqueous electrolyte by mixing the organic lithium product salt with an alkyl carbonate solvent.

2. A method as in claim 1, wherein the alkyl carbonate solvent is ethylene carbonate, dimethyl carbonate, diethyl carbonate, ethylmethyl carbonate, or propylene carbonate.

3. A method as in claim 1, wherein between steps (a) and (b) there is practiced the step of drying the organic lithium processor salt.

* * * * *